United States Patent [19]

Glaser et al.

[11] 3,870,539

[45] Mar. 11, 1975

[54] TEMPORARY PRINTING CARRIERS

[75] Inventors: Heinz Glaser, Kandern, Germany;
 Vassil Zlatareff, Fullinsdorf,
 Switzerland

[73] Assignee: Societe d'Etudes du Procede Noridem, Glarus, Switzerland

[22] Filed: Oct. 4, 1972

[21] Appl. No.: 297,032

[30] Foreign Application Priority Data
 Oct. 6, 1971  Switzerland.................... 14481/71
 July 28, 1972  Switzerland.................... 11293/72

[52] U.S. Cl.............. 117/3.1, 117/45, 117/3.4,
 161/167, 161/208, 161/263, 161/268,
 161/406, 161/413
[51] Int. Cl....... B32b 7/06, B32b 27/10, C09j 7/02
[58] Field of Search............ 117/3.1, 3.4, 3.6, 12,
 117/15, 45; 161/406, 413, 167, 208, 214,
 219, 263, 268

[56] References Cited
 UNITED STATES PATENTS

| | | | |
|---|---|---|---|
| 2,159,693 | 5/1939 | Gaylord, Jr. | 117/3.4 |
| 2,353,717 | 7/1944 | Francis, Jr. et al. | 117/3.4 |
| 2,556,078 | 6/1951 | Francis, Jr. | 161/406 X |
| 2,635,974 | 4/1953 | Terry | 161/406 X |
| 3,516,904 | 6/1970 | Klinker, Jr. | 161/406 X |
| 3,617,364 | 11/1971 | Jarema | 161/406 X |
| 3,666,516 | 5/1972 | Dunning | 117/3.4 |

*Primary Examiner*—Charles E. Van Horn
*Assistant Examiner*—Thomas E. Bokan
*Attorney, Agent, or Firm*—Wenderoth, Lind & Ponack

[57] ABSTRACT

A temporary carrier of paper, aluminium, regenerated cellulose, polyester terephthalate or polyolefine sheets, or laminates thereof, which carries on one of its surfaces a detachable film of pigmented vinyl resins with a preferably multi-coloured pattern or design, an underlying layer consisting of a mixture of nitrocellulose and an aminoplast or of nitrocellulose and an alkyd resin, wherein there is present on the detachable film a thin adhesive layer containing resins which are soluble in organic solvents and possess a pendulum hardness according to König (DIN 53 157) of at least 85 seconds, a process for the manufacture of said temporary carrier, and a process for the dry transfer of all desired design on a definitive A.B.S., polycarbonate, polyvinyl chloride or polystyrene surface, which comprises overlaying said temporary carrier on the surface required to be decorated, on or after the manufacture of the latter, subsequently exposing it to the action of heat, pressure or both, and detaching the temporary support from the decorated surface, optionally after cooling.

13 Claims, No Drawings

TEMPORARY PRINTING CARRIERS

It is known that plastic sheets or coatings, in particular PVC sheets and coatings, can be decorated with advantage by the heat transfer printing process, in which the sheet or coating to be provided with the required decorative pattern is pressed together with a coating applied to a flexible support, mostly of paper, aluminium, or films of regenerated cellulose, polyester terephthalate, polyolefine, or laminates thereof, with the application of heat. The coatings which contains the pigments and designs required for providing the decorative patterns can be easily detached from the flexible support, from which it is divided by a layer consisting usually of silicones, or, as in the case of Belgian Patent No. 756,694 (Case TTT-5/E), of a mixture of nitrocellulose and an aminoplast, and adheres to the original sheet or coating. Using the temporary transfer carriers of the cited Belgian patent, an unsuccessful attempt was also made to decorate polystyrene surfaces, principally foamed polystyrene. The decorating layer of the temporary carriers does not adhere to polystyrene at all, or it does so in a highly unsatisfactory manner.

The present invention relates to temporary carriers with which it is also possible to print or dye satisfactorily A.B.S. (copolymer of acrylonitrile, butadiene and styrene), polycarbonate or polystyrene objects, e.g. sheets, films, panels, coatings or shaped objects made from foamed or non-foamed polystyrene, and also to the dry transfer process referred to. The carriers according to the invention consist of a flexible support (e.g. of paper, films of regenerated cellulose, polyester terephthalate, polyolefine, or laminates thereof, or aluminium), a thin dividing layer which consists of a mixtures of nitrocellulose with an aminoplast or an alkyd resin and a superimposed pigmented vinyl resin coating which carries an overlacquering of resins which are soluble in organic solvents and display a pendulum hardness according to König (DIN 53 157) of at least 85 seconds.

The invention therefore relates also to the manufacture of such carriers. The temporary carriers are manufactured by first coating one of the surfaces of the flexible support by means of printing cylinders or some other appropriate means (e.g. rotagravure, photogravure, offset, or by the coating process) with a thin and flawless layer of a mixture of nitrocellulose and an alkyd resin or, preferably, a thermosetting aminoplast.

The temporary carriers may be coated once or more than once with 1 to 10 g of the mixture per m2. For this purpose it is preferable to use a varnish, an emulsion or a solution of the mixture in a volatile organic solvent. After drying the coating and, if appropriate, recovering the solvent, there remains on the paper a uniform layer of nitrocellulose-alkyd resin or aminoplast mixture. This layer may in some cases contain a very slight amount of plasticiser which is optionally used in order to ensure that the layer is homogeneous and flexible. The best results are obtained with mixtures which contain 4 to 6 parts of nitrocelluloses to 10 parts of the mixture, the remainder consisting of the aminoplast or alkyd resin.

A condensation product of formaldehyde and melamine, or, preferably, urea is used as curable aminoplast. Urea-formaldehyde resins which are soluble in alcohol give the better results. The coating according to the present invention may also be obtained with a butanol solution containing from 50–60% of a condensation product of urea with formaldehyde, with which the desired amount of nitrocellulose is mixed. Instead of butanol, it is also possible to prepare solutions in, for example, ethyl alcohol.

The aminoplast used may be prepared by known methods described, for example, in British Patent No. 483,399 or in Volume 3, page 482 of Ullmanns Enzyklopaedie der technischen Chemie (Ullmann's Encyclopaedia of Industrial Chemistry). As thermosetting aminoplast it is also possible to use urea-formaldehyde resins containing a varying amount of alkyd resins to make the coatings more flexible.

The mixture to be used according to the invention can easily be prepared by simple addition of a solution of nitrocellulose to the solution of the chosen aminoplasts. A nitrated cellulose containing about 11% of nitrogen, that is to say dinitrocellulose, may be used as nitrocellulose. The mixture obtained can thereafter, if necessary, be diluted, for example with acetone or methyl ethyl ketone, in order to arrive at the desired viscosity. It is also possible to add a small amount of a plasticiser, for example from 0.3 to 0.8% of octyl adipate, to the mixture, so that the layer formed is not brittle.

The solution of the aminoplast-nitrocellulose mixture can be applied to the temporary carrier by any appropriate means, preferably by photogravure or by coating.

The flexible support consists advantageously of a sheet, ribbon or strip of paper or of regenerated cellulose, polyester terephthalate, polyolefines or laminates thereof, preferably of slightly porous or non-porous paper, e.g. art paper or highly calendered paper. It is also possible to use an aluminium foil.

The required design or pattern is printed on the dividing layer of nitrocellulose and alkyd resin in an appropriate manner (rotagravure, photogravure, flexographic printing, offset, silk screen etc.).

In order to protect the pattern after transfer, for example against abrasion, it is also possible to coat or print the layer consisting of nitrocellulose and aminoplast with a protective varnish of PVC or copolymers having the same properties as the printing inks of the patterns to be transferred.

The design to be transferred (printing design or coloration) is printed on the dividing layer with inks which consist of a pigment, a vinyl resin, e.g. a vinyl chloride polymer or copolymer, for example the copolymer of 85–90% of vinyl chloride and 15–10% of vinyl acetate, and a solvent or a mixture or organic solvents.

As pigments there are used preferably pigment preparations based on dyes which in general are organic, have a high molecular weight, and are finely dispersed and embedded in the vinyl resins. The pigments themselves may be azo pigments which are obtained by coupling or condensation from anthraquinone, thiondigo, dioxazine, phthalocyanine dyes or other analogous organic pigments which may provide a transparent or opaque layer.

In certain cases, where the question of transparency does not arise, inorganic pigments may be advantageously used. This is the case with white, where a pigment based on titanium oxide is preferably used or the metallised pigments which generally contain a more or less fine aluminium powder as the pigment. In the pigment preparations to be used for the preparation of the inks, these pigments are advantageously coated with a vinyl chloride polymer or copolymer; vinyl acetate chloride copolymer (especially a copolymer of 85% of vinyl chloride and 15% of vinyl acetate) is especially suitable.

As appropriate pigment preparations, there may be mentioned those described in French Patent No. 1,079,477 and more especially those which for example contain one or more dyestuffs of formula

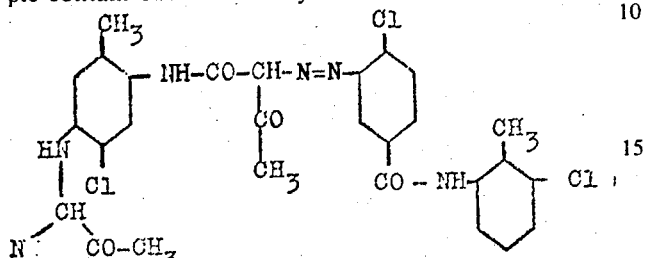

Yellow

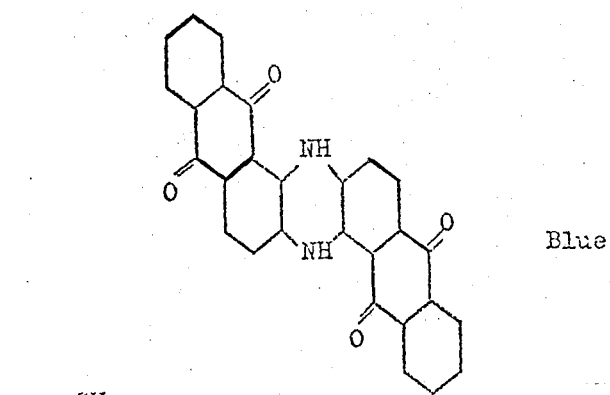

Blue

Red which are embedded in a copolymer of vinyl chloride and vinyl acetate.

Various organic solvents are used to manufacture the printing inks; aromatic and non-aromatic hydrocarbons, ketones, esters and alcohols. Solvents or solvent mixtures with boiling points below 125°C are preferably used. The pigment preparation is diluted to between 5 and 20% with 5 to 15% of vinyl chloride and vinyl acetate copolymer in 90 to 65% of solvent, and the printing ink thus obtained is applied to the intermediate coating to produce the desired designs and patterns. The application is effected by employing conventional methods, i.e. by printing with inked printing rollers.

After drying, there is applied an adhesive layer consisting of resins which have a pendulum hardness according to König (DIN 53 157) of at least 85 seconds.

Such resins are those which are soluble in organic solvents, such as esters, ketones, aromatic substances, glycol ethers, glycol ether acetates, tetrahydrofuran, chlorinated hydrocarbons, which are blended if desired with alcohols or petroleum hydrocarbon. Useful resins of this kind are polyalkylmethacrylate resins (e.g. polymethylacrylate, polyethylacrylate or polybutylacrylate resins), as well as other acrylic acid derivatives (e.g. ethyl acrylate). It is advantageous to coat the pigmented layer completely with a solution or coating of the cited resins and subsequently to dry it, in the process of which a thin adhesive layer remains on the pigmented layer.

In order to avoid clogging effects in manufacturing the decorated temporary carriers (clogging on the roller), it is possible to add a small percentage of assistants to this adhesive layer, e.g. cellulose acetobutyrate, or also a delustring agent, such as pure or superficially treated silicic acid.

In this manner there are obtained temporary carriers which carry a colourless or a plain or multi-colored vinyl resin film which, due to the intervening dividing layer, may be easily detached from the flexible support of the carrier and, due to the adhesive layer, adheres to A.B.S., polycarbonate or polystyrene surfaces. The thickness of the transferable film may vary; good results are obtained with films of $0.5\mu$, but thicker films, e.g. of 8 to $10\mu$, can also be easily detached.

The superimposed vinyl resin films and the adhesive layer may be transferred simultaneously with the manufacture of the surface to be decorated, e.g. during extrusion, continuously or discontinuously.

The following Examples illustrate the invention, but without being in any way limitative thereof. The parts and percentages are by weight, unless otherwise stated.

EXAMPLE

One of the faces of a sheet of a Kraft type of paper is coated with a varnish of the following composition: urea-formaldehyde resin of the type of

| | |
|---|---|
| Plastopal AT (BASF) | 21 parts |
| nitrocellulose solution (20%) in isopropanol/ methyl ethyl ketone (1:2) | 49 parts |
| methyl ethyl ketone | 30 parts | in such a way that after evaporation of the solvent and drying at 90°, 5 g of dry product remain per m².

First a transparent varnish and then coloured designs are printed on the face coated in this way, by means of several inking rollers, using inks of the following composition:

12% of a pigment preparation, for example "Mikrolithe K",
6% of a copolymer of vinyl chloride and vinyl acetate,
10% of toluene and
72% of methyl ethyl ketone.

The layer with the coloured designs is subsequently coated with a solution of 25 parts of polybutylmethacrylate (Plexigum P 24) in 65 parts of ethyl acetate and 10 parts of methyl ethyl ketone. After drying, a temporary carrier according to the present invention is obtained. The layer containing nitrocellulose permits easy detachment from its paper carrier of the film to be transferred. If the temporary carrier is manufactured in this way, the transfer can be effected by application to the definitive carrier. The transfer is carried out by the simultaneous action of heat and pressure. When applying heat, care must be taken to remain within a temperature range which does not exceed 100°–130°C on account of the sensitivity of foamed polystyrene to the action of heat. The application of heat is followed by cooling at normal temperature, which in turn is immediately followed by easy removal of the temporary carrier.

To form the adhesive layer, it is possible to use instead of a solution of 25 parts of polybutylmethacrylate (Plexigum P 24) in 65 parts of ethyl acetate and 10 parts of methyl ethyl ketone, a solution of 28 to 32 parts of polyethyl methacrylate (Plexigum N 80) in 72 to 68 parts of ethyl acetate, a solution of 25 to 26 or 18 to 22 parts of polybutylmethacrylate (Plexigum P 24 and 26 respectively) in 75 to 72 or 82 to 78 parts of ethyl acetate, or of 10 to 12 parts of polymethylmethacrylate (Plexigum M 334 or M 910) in 90 to 88 parts of ethyl acetate.

The transfer may also be effected on hard and soft PVC surfaces, on polycarbonate, A.B.S. or non-foamed polystyrene sheets and panels. In this case it is possible to use temperature ranges higher than 100°–130°C, e.g. 120°–140°C (for Plexigum P 24), 130°–150°C (for Plexigum P 26), 160°–200°C (for Plexigum M 334 or M 910).

We claim:

1. A temporary carrier of paper, aluminium, regenerated cellulose, polyester terephalate or polyolefine sheets, or laminates thereof, which carries on one of its surfaces a detachable film of pigmented vinyl resins with a preferably multi-coloured pattern or design, an underlying layer consisting of a mixture of nitrocellulose and an aminoplast or of nitrocellulose and an alkyd resin, wherein there is present on the detachable film a thin adhesive layer containing resins which are soluble in organic solvents and possess a pendulum hardness according to König (DIN 53 157) of at least 85 seconds.

2. A sheet according to claim 1, which has as adhesive layer an acrylic alkyl ester or polyalkylmethacrylate layer.

3. A sheet according to claim 1, which carries said one of its surfaces a coating of a mixture of nitrocellulose and a urea-formaldehyde resin, said coating being covered with a film based on polyvinyl chloride or a vinyl chloride and vinyl acetate copolymer and carrying multi-colored designs.

4. A sheet according to claim 1, which carries a coating of a mixture of nitrocellulose and alkyd resins whereon the pigmented layer is located.

5. A sheet according to claim 1, which carries 2 to 7 g of the mixture containing nitrocellulose per m$^2$.

6. A sheet according to claim 1, wherein said detachable film has a thickness of 0.5 to 6.0 $\mu$.

7. A sheet according to claim 1, wherein said detachable film consists of polyvinyl chloride or a vinyl chloride or vinyl acetate copolymer and 10 to 50% of very finely dispersed pigment.

8. A paper sheet according to claim 1, which carries a mixture consisting of 40 to 50% of nitrocellulose, the remainder being a condensation product of urea and formaldehyde.

9. A paper sheet according to claim 1, which carries a thin adhesive layer of polymethyl-, polyethyl- or polybutylmethacrylate on the film which can be detached from the carrier support.

10. A sheet according to claim 1, which contains 0.5 to 1% of cellulose acetobutyrate in the adhesive layer.

11. A sheet according to claim 1, which contains 0.5 to 1% of silicic acid in said adhesive as a delustering agent.

12. A temporary carrier according to claim 1, wherein the carrier is a paper sheet which carries on said one of its surfaces the following superimposed films:
   a. a layer of a mixture consisting of 40 to 60% of nitrocellulose, the remainder being a condensation product of urea and formaldehyde or an alkyl resin,
   b. a transparent or opaque print based on finely disposed organic pigments which are embedded in polyvinyl chloride or a vinyl chloride and vinyl acetate copolymer,
   c. a thin layer containing polyalkylmethacrylate resins which are soluble in organic solvents and have a pendulum hardness according to König (DIN 53 157) of at least 85 seconds.

13. A temporary carrier according to claim 12, wherein layer c) consists essentially of polyalkylmethacrylate resins which are soluble in organic solvents and have a pendulum hardness according to König (DIN 53 157) of at least 85 seconds.

* * * * *